United States Patent Office 3,544,654
Patented Dec. 1, 1970

3,544,654
TWO COMPONENT ABLATIVE COMPOSITION COMPRISING A CHROMIUM PHOSPHINATE POLYMER AND A THERMOSETTING EPOXY RESIN
Gerald J. Fleming, Bowie, and Francis J. Koubek, Ellicott City, Md., assignors to the United States of America as represented by the Secretary of the Navy
No Drawing. Filed Apr. 10, 1967, Ser. No. 629,821
Int. Cl. C08g 43/02, 45/04
U.S. Cl. 260—830
7 Claims

ABSTRACT OF THE DISCLOSURE

An ablative composition composed of an ablative polymer of chromium phosphinate admixed in a thermo-setting resinous binder such as epoxy novolac.

BACKGROUND OF THE INVENTION

This invention relates generally to ablative compositions and more particularly to ablative compositions made up of a mixture of a thermo-setting material and a polymetallic phosphinate.

Ablative compositions have found increasing utility of late as heat shields for aerospace vehicles, as coverings for nose cones on missiles, as rocket case liners in solid propellant rockets and, in general, as heat barriers in industrial applications wherever shielding from high temperatures is desired.

Ablative compositions have been prepared in the past most usually from thermo-setting resins such as the phenolics or the epoxides with some compositions made from Teflon. The organic material is rarely used alone but is commonly used with a filler such as powdered silica, titanium oxide, magnesium hydroxide and powdered graphite or carbon. This procedure adds unnecessary weight to the ablative composition. Prior art ablative compositions are also made in laminate form wherein the organic ablative material is coated on a cloth filler such as carbon, graphite or Refrasil and built up in layers to the desired thickness. However, where these ablative compositions are exposed to high temperatures and to a high velocity gas blast, very rapid mechanical degradation on the surface of the material occurs causing a separation of the laminations as well as fusion and decomposition of the laminate.

This type of ablative composition also poses a problem in fabricating large heat shield surfaces of irregular configuration due to the necessity of forming the ablative composition to large contoured areas.

Other problems in this field include the necessity of balancing two design parameters, erosion rate and thermal conductivity. Ideally an ablative composition should have a low erosion rate and a low thermal conductivity to act as a barrier to heat transfer through the shield and to withstand degradation for as long as possible. Purely organic ablative compositions often are deficient in one parameter and are thus not entirely satisfactory for use as heat shields under conditions wherein the shield is subjected to high heats and eroding effects.

Another disadvantage to prior known ablative compositions is that these compositions have a relatively high specific gravity making their use in aerospace applications prohibitive as weight is a critical factor for all components of an aerospace vehicle.

SUMMARY OF THE INVENTION

The objects of the present invention are to provide an ablative composition having a high thermal stability, low erosion rate, low thermal conductivity and low specific gravity. These and other objects are accomplished by utilizing a two component polymeric system wherein the inorganic polymer is a linear double-bridged chromium phosphinate polymer intimately blended or dissolved in an organic polymer such as epoxy novolac.

DESCRIPTION OF THE PREFERRED EMBODIMENTS

According to the present invention the linear double-bridged chromium phosphinate polymers used herein are generally prepared by suspending a small quantity of monohydrate of chromium acetate in deoxygenated water and refluxing for one hour. A neutralized solution of an olefinic phosphinic acid is then added at a rate so as to avoid violent foaming or excessive thickening. While the resultant structure is not known precisely it is theorized that it will have one of the following possibilities:

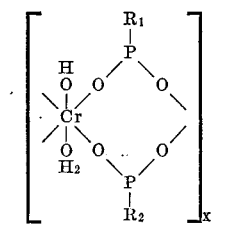

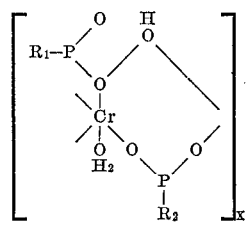

or

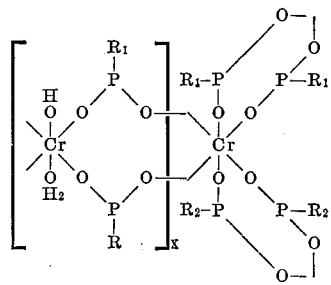

wherein $R_1$ and $R_2$ may be either phenyl or lower alkyl and where $x$ is an integer from 2 to 30.

The linear double-bridged chromium phosphinate polymers of this invention, $$[Cr(H_2O)(OH)(OPR_1R_2O)_2]_x$$

show remarkable thermal stability. In general no thermal decomposition occurs at temperatures up to 370° C. to 380° C. and no major heat effects but only ill-defined deviations from the base line in the temperature region 335° C.–520° C.

The thermo-setting resins used in the present invention that are generally applicable are the epoxy novolacs, the condensation products of bisphenol A and epichlorohydrin represented by the formula:

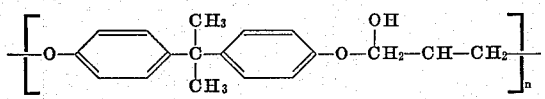

cycloaliphatic epoxides and polyglycidyl ethers of polyhydroxyphenols and related structures. Among these are diglycidyl ether of bisphenol A, resorcinol diglycidyl ether, vinylcyclohexane dioxide, 3,4-epoxy - 6 - methylcyclohexylmethyl - 3,4 - epoxy-6-methylcyclohexane carboxylate, polyphenyl glycidyl ether, polyglycidyl ether of phenolformaldehyde novolac, polyglycidyl ether of orthocresolformaldehyde novolac, tetraglycidyl ether of tetraphenylene ethane, polyglycidyl ether of polyhydroxyterphenyl and bis(2,3-epoxycyclopentyl) ether. Preferred are the epoxides that have a high content of aromatics and a fairly low epoxide equivalent, under 200, such as polyglycidyl ether of phenolformaldehyde novolac.

The thermo-setting resins can be cured by any one of the following curing agents: nadic anhydride, tetrahydro phthalic anhydride, chlorendic anhydride, 9,10-dihydro-9,10-ethanoanthrancene-11, 12-dicarboxylic anhydride, maleic anhydride, 4,4'-diaminodiphenyl sulfone, 4,4'-methylenediamine, 3,3',4,4'-benzophenone tetracarboxylic dianhydride, m-phenylenediamine, boron trifluoride monoethylamine, trimellitic anhydride, and tetrachlorophthalic anhydride. Preferred, however, are the bridged anhydrous Diels-Alder adducts such as nadic methyl anhydride.

The ablative composition of the present invention is prepared by mixing the epoxide resin with the chromium phosphinate in a ratio of 1:1 to 3:1 and wherein the curing agent if the curing agent is an amine is 80 to 100% stoichiometric amount of the resin, 75 to 95% stoichiometric amount if the curing agent is an anhydride and 1 to 3% by weight if the curing agent is boron trifluoride and similar polymerization initiators. Although curing may be accomplished with a lower proportion of curing agent this usually results in a more rubber-like composition which is undesirable for the application herein contemplated. Also included is a catalytic amount of a catalyst normally less than 5% by weight and more preferably less than 1%. These catalysts are most preferably the tertiary amines and among these are triethylamine, dimethylaminomethyl phenol, tris (dimethylaminomethyl) phenol, benzyldimethylamine, alphamethyl benzyldimethylamine, triethylenediamine, 1,1,3,3 - tetramethyl guanidine, n,n,n',n'-tetramethyl - 1,3 - butanediamine, triethanol amine, quadrol, propyl dimethylaminobenzene, 3-phenoxy-2-hydroxy propyl dimethylamine and propyl diethylamine.

The chromium phosphinate polymer eliminates the necessity of prior art fillers thereby reducing the specific gravity of the resultant ablative composition. It is to be understood that if desired prior art fillers such as carbon cloth, graphite cloth, Refrasil or powdered silica titanium oxide, magnesium hydroxide and powdered graphite or carbon may also be advantageously used for special purpose ablatives.

To illustrate the manner in which the invention may be carried out, the following examples are given. It is understood, however, that the examples are for the purpose of illustration and the invention is not to be regarded as limited to any of the specific conditions cited herein.

EXAMPLE 1

Preparation of the linear double-bridged chromium phosphinate polymers.

A suspension of 2.3–2.5 parts of freshly prepared moist monohydrate of chromium acetate in a dilute aqueous solution of deoxygenated water was refluxed for one hour under a continuous flow of nitrogen while being stirred magnetically. Solid particles were washed down occasionally by manually shaking the flask. A solution of potassium diphenylphosphinate prepared by exact neutralization of 7.5 parts diphenylphosphinic acid with potassium hydroxide, was purged with nitrogen for 45 minutes and then added to the hot suspension at a rate such as not to cause violet foaming or excessive thickening of the reaction mixture. The reaction mixture containing a very pale-colored precipitate, was heated with stirring at reflux for 5 minutes, cooled and stirred an additional hour at room temperature. The reaction mixture was then filtered and washed with deoxygenated water with absolute exclusion of oxygen. The solid was then oxidized by dispersing it in water and stirring the suspension while exposing it to air or passing a stream of air through the suspension maintained at 90° C. After the oxidized product was filtered off, washed with water, and dried at 100° C., it was added to a solution of benzene and stirred until dissolved. The insolubles (usually minute) were then removed by filtration and the resulting solution was evaporated at room temperature in a stream of nitrogen. The brittle resinous film thus produced was dried at 120° C. to yield a polymer with an intrinsic viscosity of .3 to .7 in freshly prepared chloroform solution. The viscosities generally increased to .8 to 1.1 when a 1% solution was held at 54° C. for 10 days, although values ranging from .5 to 1.5 have been observed.

*Analysis.*—Calculated for $C_{24}H_{23}CrO_6P_2$ (percent): C, 55.29; H, 4.45; Cr, 9.97; P, 11.88. Found (percent): C, 55.93; H, 4.65; Cr, 9.7; P, 11.78.

The dimethyl and methylphenyl chromium phosphinate polymers are prepared in essentially the same manner by using the appropriate olefinic substituted phosphinic acid.

EXAMPLE 2

Preparation of the ablative composition.

75 parts of polyglycidyl ether of phenolformaldehyde novolac and 63 parts of nadic methyl anhydride were mixed together and held for 20 minutes at 100° C. with stirring. Then 27.6 parts of powdered diphenyl substituted chromium phosphinate were added and the mixture stirred for 15 minutes at 100° C. to obtain a homogeneous mixture. The mixture was then placed under a partial vacuum of 25 mm. Hg for 5 minutes to remove any entrapped air. A catalyst, 1.5 parts of benzyldimethylamine, was then added and the 100° C. temperature maintained for five minutes. The mixture was now cast into the desired form and allowed to gel for 15 minutes at an oven temperature of 110° C. The resultant gel was then cured for 1½ hours at 110° C., 16 hours at 135° C., 60 hours at 175° C. and 2 hours at 225° C. for complete curing and to drive any unreacted species to completion.

The dimethyl and methylphenyl compositions are prepared in essentially the same manner by using the appropriate olefinic substituted chromium phosphinate polymer.

Two of the ablative compositions of the present invention were tested and compared with a standard ablative composition for a comparison of erosion rate and thermal conductivity. The test technique used comprised forming the ablative compositions into a ¾ inch diameter test rod having a thermocouple embedded ⅜ inch behind the front face of the rod. An oxy-acetylene torch was positioned to impinge its flame on the front face of the test specimen and the specimen was fed forward at a rate equal to its ablation rate to keep the distance between the front face and the torch constant. The thermocouple imbedded in the specimen measures the thermal conductivity as a function of the time required to reach a specified temperature. Sample number 1 in the table below is the standard ablative composition and was prepared according to the procedure outlined in Example 2 above wherein the resin used was polyglycidyl ether of phenolformaldehyde novolac (DEN 438) and the curing agent was nadic methyl anhydride (NMA) and instead of the olefinic substituted chromium phosphinate polymer a filler of 20% silica was used. Sample 2 was an ablative composition of the instant invention prepared according to the procedure outlined above and comprising the diphenyl substituted chromium phosphinate polymer while Sample 3 was an ablative composition prepared as outlined above comprising the phenylmethyl substituted chromium phosphinate polymer.

| Sample No. | Ablative | Erosion rate (mils/sec.) | Test time (sec.) | Time to 200° C. (sec.) | Specific gravity |
|---|---|---|---|---|---|
| 1 | DEN 438 plus NMA plus silica | 3.83 | 117 | 81.7 | 1.30 |
| 2 | DEN 438 plus NMA plus polydiphenyl chromium phosphinate. | 2.28 | 126 | 115 | 1.26 |
| 3 | DEN 438 plus NMA plus polyphenylmethyl chromium phosphinate. | 2.04 | 166 | 128 | 1.26 |

It can be seen from the test results that the standard ablative composition using a silica filler had a higher specific gravity, a faster erosion rate and a lower thermal conductivity as evidenced by the time it took for the thermocouple to register 200° C. On the other hand the ablative compositions of the present invention without using a filler had a lower specific gravity thus making its use in aerospace environments attractive and showed substantially increased resistance to erosion with a correspondingly higher thermal conductivity.

One of the possible mechanisms occurring during ablative conditions that may account for the increased effectiveness is that an endothermic reaction occurs causing the water of hydration within the chromium phosphinate polymer to split out and cool the char being formed and as it turns to water vapor it forms a steam shield on the front face thus aiding the ablative resistance characteristics.

While there are above disclosed but a limited number of embodiments of the ablative composition of the present invention it is still possible to provide other embodiments without departing from the inventive concept herein disclosed. It is therefore to be understood that the invention is limited only by the scope of the appended claims.

What is claimed is:

1. An ablative composition comprising an admixture of an inorganic linear double-bridged chromium phosphinate polymer of the form $[Cr(H_2O)(OH)(OPR_1R_2O)_2]_x$ wherein $R_1$ and $R_2$ may be either phenyl or lower alkyl and $x$ an integer from 2 to 30 in a thermosetting epoxy resin.

2. An ablative composition comprising a cured admixture of an inorganic linear double-bridged chromium phosphinate polymer of the form $$[C(H_2O)(OH)(OPR_1R_2O)_2]_x$$

wherein $R_1$ and $R_2$ may be either phenyl or lower alkyl and $x$ an integer from 2 to 30 in a thermo-setting epoxy resin in a weight ratio of 1:1 to 1:3.

3. The composition of claim 2 wherein said thermosetting epoxy resin is selected from the group consisting of the epoxy novolacs, the condensation products of bisphenol A and epichlorohydrin, the cycloaliphatic epoxides and the polyglycidyl ethers of polyhydroxyphenols.

4. The composition of claim 2 wherein the admixture is cured with a curing agent.

5. The composition of claim 4 wherein the curing agent is nadic methyl anhydride.

6. The composition of claim 3 wherein the thermosetting epoxy resin is selected from the group consisting of diglycidyl ether of bisphenol A, resorcinol diglycidyl ether, vinylcyclohexane dioxide, 3,4-epoxy-6-methylcyclohexyl methyl - 3, -4-epoxy-6-methylcyclohexane carboxylate, polyphenyl glycidyl ether, polyglycidyl ether of phenolformaldehyde novolac, polyglycidyl ether of ortho cresolformaldehyde novolac, tetraglycidyl ether of tetraphenylene ethane, polyglycidyl ether of polyhydoxy terphenyl and bis(2,3-epoxycyclopentyl) ether.

7. The composition of claim 3 wherein the thermosetting epoxy resin is polyglycidyl ether of phenolformaldehyde novolac.

References Cited

UNITED STATES PATENTS

| 3,255,125 | 6/1966 | Block et al. | 260—2 |
| 3,275,574 | 9/1966 | Saraceno | 260—2 |
| 3,316,187 | 4/1967 | Grosner et al. | 260—2.5 |
| 3,384,604 | 5/1968 | King | 260—2 |

WILLIAM H. SHORT, Primary Examiner

H. SCHAIN, Assistant Examiner

U.S. Cl. X.R.

260—2, 37, 47